Figure 1:
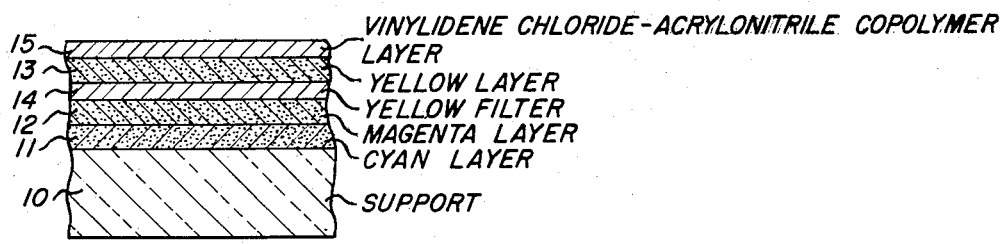

May 12, 1959  R. J. ROTONDO ET AL  2,885,936
DIMENSIONALLY STABLE PHOTOGRAPHIC FILM TRANSPARENCIES
Filed June 7, 1956  2 Sheets-Sheet 1

RICHARD J. ROTONDO
JOHN G. STREIFFERT
INVENTORS

BY
ATTORNEYS

May 12, 1959 R. J. ROTONDO ET AL 2,885,936
DIMENSIONALLY STABLE PHOTOGRAPHIC FILM TRANSPARENCIES
Filed June 7, 1956 2 Sheets-Sheet 2
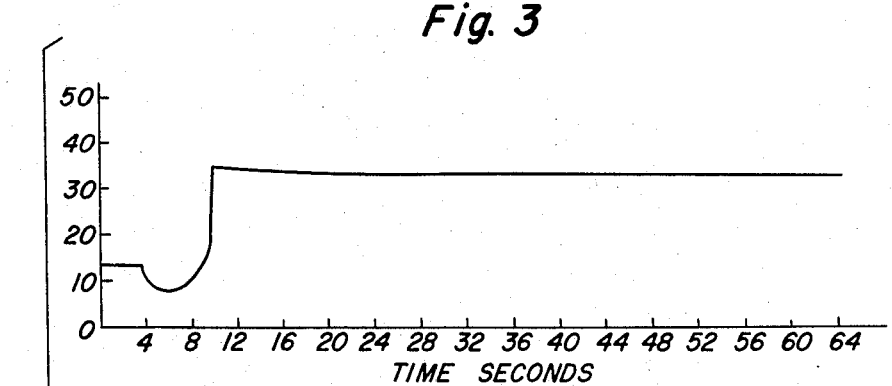
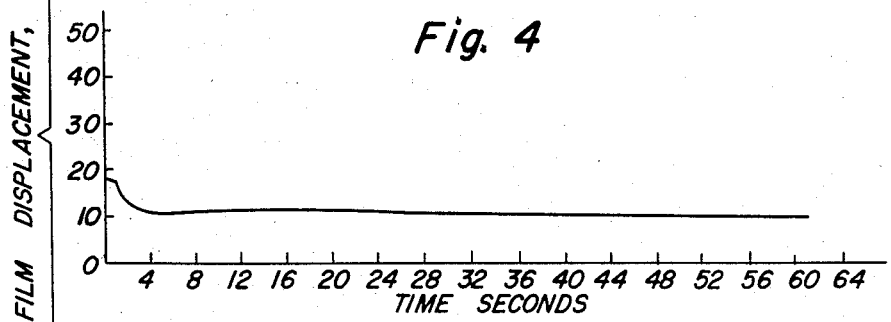
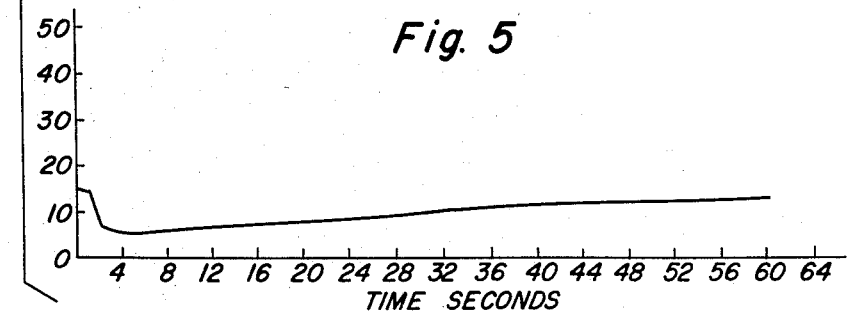
RICHARD J. ROTONDO
JOHN G. STREIFFERT
INVENTORS
BY
ATTORNEYS

United States Patent Office 2,885,936
Patented May 12, 1959

2,885,936

DIMENSIONALLY STABLE PHOTOGRAPHIC FILM TRANSPARENCIES

Richard J. Rotondo and John G. Streiffert, Rochester, N.Y., assignors to Eastman Kodak Company, Rochester, N.Y., a corporation of New Jersey Application June 7, 1956, Serial No. 590,051

2 Claims. (Cl. 95—1)

This application concerns dimensionally stable photographic film elements, more particularly, colored transparencies which are dimensionally stable during projection.

Colored photographic transparencies have been used extensively for projection using slide projectors and projecting the image on a suitable surface such as a beaded glass screen. During the projection of these transparencies, a certain amount of heat from the projection lamp causes moisture in the transparency to evaporate and the transparency to bend or shift its focal plane. This changes the focus of the transparency and requires refocusing of the projector to compensate for the shifting focal plane. This phenomenon is known as "popping."

Many attempts have been made to solve the problem of popping in colored slides. Since these slides usually have a cellulose ester film base, an attempted solution to the problem has been to coat the cellulose ester base with some moisture proofing material in order to avoid absorbing moisture into the film base or to avoid losing the moisture from the film base during projection. We have found, however, that popping in colored slides can be avoided by applying a lacquer coating of a vinylidene chloride-acrylonitrile copolymer over the emulsion following normal processing. This coating controls the rate of moisture release from the slide during projection.

One object of this invention is to protect color transparencies from moisture absorption due to humidity conditions of the atmosphere. Another object is to provide color transparency slides which have a reduced tendency to pop during projection. An additional object is to provide a method of coating color transparencies to reduce the tendency for these transparencies to absorb moisture.

The above objects are obtained by coating the photographic transparencies with a lacquer comprising a copolymer of vinylidene chloride and acrylonitrile dissolved in an organic solvent solution. Solvents which may be used include ketones such as methyl ethyl ketone and methyl isobutyl ketone, cyclohexanone, toluene, xylene, Cellosolve and the like. Water emulsion latices may also be used.

We have found that the copolymer which is most satisfactory contains 78% of vinylidene chloride and 22% acrylonitrile. However, copolymers containing from 92 to 60% vinylidene chloride and from 8 to 40% acrylonitrile may also be used.

The film base which contains the photographic emulsion is processed according to normal photographic processing techniques and emerges containing a colored photographic image in a series of galatin layers over the film base. The copolymer lacquer is applied over these gelatin layers by any of the usual coating methods such as by immersing the surface of the film into the coating material, spraying, beading, or coating from a hopper provided with a doctor blade, etc. Although coatings may be applied to both sides of the transparency, we have found that coating the side containing the gelatin emulsion is sufficient to provide protection against moisture absorption and to protect the transparency against popping during projection.

Figure 2:
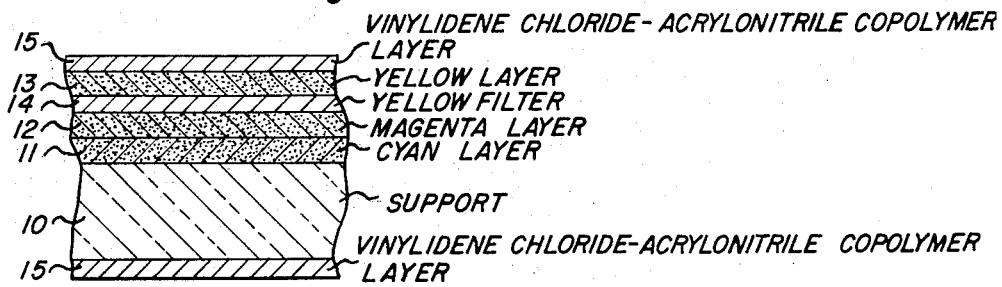

Color films other than the one shown in Figs. 1 and 2 are also intended to be within the scope of our invention. These may have various layers and may be based on various systems, since the operation of our invention does not depend upon the particular color system used.

Proportions used herein are by weight unless indicated otherwise.

The invention will be further illustrated but is not intended to be limited by the following examples:

*Example 1*

A solvent mixture of about 90 parts by weight of methylisobutyl ketone and 10 parts by weight of methyl ethyl ketone was prepared. Into about 95 parts of this solvent mixture was dissolved 5 parts by weight of a copolymer of vinylidene chloride-acrylonitrile having 78% vinylidene chloride and 22% acrylonitrile with rapid agitation. The solution was then filtered and applied to the film by the Wick method. The film was dried for one minute at 112° F.

*Example 2*

A solvent mixture of about 60 parts by weight of methylisobutyl ketone, about 35 parts by weight of methyl ethyl ketone, and 5 parts by weight of cyclohexone was prepared. Into 95 parts by weight of this solvent mixture was dissolved 5 parts by weight of the same copolymer used in Example 1 which was added with rapid agitation. The lacquer was applied by the Wick method.

In the drawings, Fig. 1 is a sectional view of a typical color transparency showing the various gelatin layers on a transparent support and showing the position of the vinylidene chloride acrylonitrile layer over the gelatin layers. The support 10 may be cellulose acetate, cellulose acetate butyrate or the like. The colored layers are usually composed of a cyan layer 11, a magenta layer 12, and a yellow layer 13. A yellow filter 14 is located between the magenta layer and the yellow layer. The vinylidene chloride acrylonitrile copolymer layer 15 is coated over the gelatin layer in Fig. 1. A variation in which vinylidene chloride-acrylonitrile copolymer layers are coated on both sides of the transparency is shown in Fig. 2.

Figs. 3–5 shows the displacement versus time relation for transparencies. The abscissa is expressed as time in seconds from left to right, each major division representing 4 seconds. The ordinate is a displacement of the film during projection measured in mils. Assuming normal projecting with emulsion towards a lens in a slide projector, movement of the trace toward the bottom of the chart represents motion of the film toward the projection lens, and movement toward the top of the chart represents motion of the film toward the projection lamp. The ordinate scale is 0.01 inch per major division.

Fig. 3 shows the displacement of a color film transparency which has not been lacquered. Fig. 4 shows a color film transparency having a vinylidene chloride lacquer on one side of the transparency, over the gelatin layers. Fig. 5 shows a color transparency having the same lacquer applied to both sides.

The first break in the traces at the left of the chart indicates the point at which the projection lamp is turned on. In Fig. 3, the film first moved toward the lens, then started back, then suddenly popped toward the top of the scale, and then drifted downward slightly during the remainder of the time the lamp was left on. The amplitude of the film movement with uncoated transparencies is almost invariably greater than 0.020 inch and has been observed to be as high as 0.040 inch in some cases.

The pop occurs anwhere from 2 to 16 seconds after the lamp has been turned on.

Figs. 4 and 5 show the displacement versus time relation for color slides coated with the vinylidene chloride-acrylonitrile copolymer. In both of these charts, it is shown that the film moves toward the lens, but the sudden backward movement is absent. The film remains in this position throughout the projection time without popping out of focus.

We have found that coating thickness of the lacquer can vary from 0.0001 inch to 0.0005 inch or more without any deleterious effect. Thinner coats do not give as good protection and thicker coats are found unnecessary. Drying of the lacquer on the color transparencies can be accomplished in one minute at 112° F. although a two-minute period is preferred.

These coatings are applied, not to the sensitive photographic film but to finished film, that is, film which has been developed, fixed, washed and dried. Our invention may be applied to photographic films which carry layers of gelatin, polyvinyl alcohol or the like which may pick up moisture and, therefore, pop when projected in a slide projector. It is intended that this lacquer be applied to color transparencies since these are the type most generally projected, but these coatings would be equally applicable to black and white slides if such were desired to be projected.

Numerous modifications are also included in the scope of our invention. For instance, film base other than cellulose acetate may be used such as cellulose nitrate, cellulose acetate propionate, and other cellulose organic acid ester film supports or supports of synthetic resins.

We claim:

1. Photographic film resistant to popping while optically projected in a slide projector, containing a visible image comprising a developed, fixed, washed and dried photographic film having thereon a coating of a copolymer of 92–60% vinylidene chloride and 8–40% acrylonitrile and having a thickness of 0.0001 to 0.0005 inch.

2. In a photographic transparency resistant to popping while optically projected in a slide projector and comprising a film base and at least one layer carrying a visible image, the improvement comprising coating the transparency with a coating consisting of 92–60% vinylidene chloride and 8–40% acrylonitrile and having a thickness of 0.0001 to 0.0005.

References Cited in the file of this patent
UNITED STATES PATENTS 2,008,435   Caruso _____ July 16, 1935

OTHER REFERENCES

Book, "Vinyl and Related Polymers," by Schildknecht, Wiley and Sons, New York, N.Y.